United States Patent Office 2,967,342
Patented Jan. 10, 1961

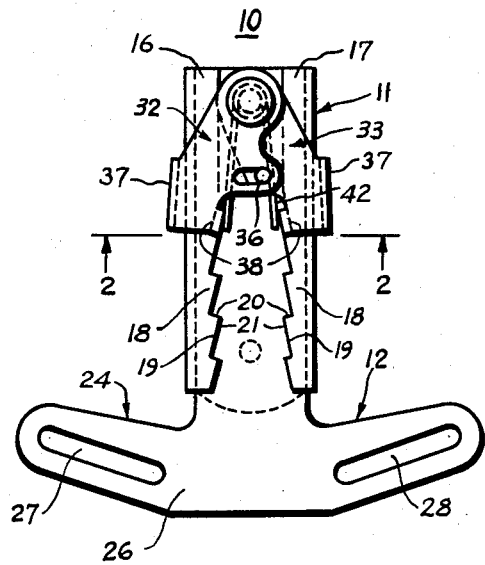
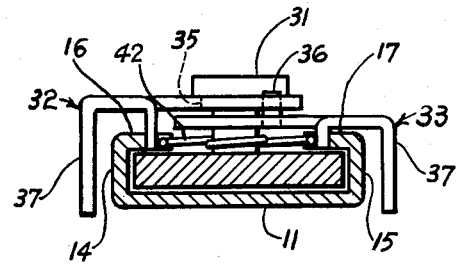
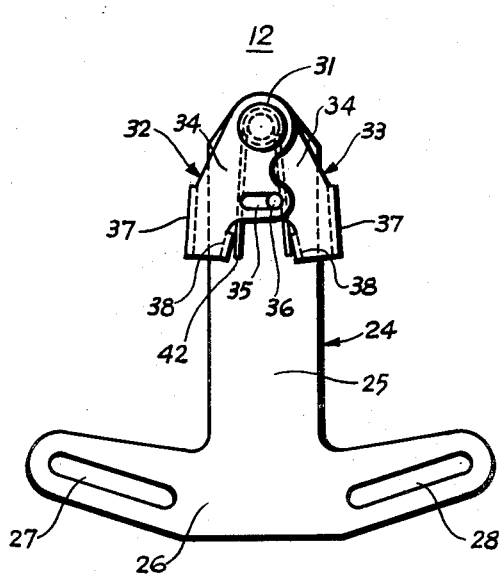
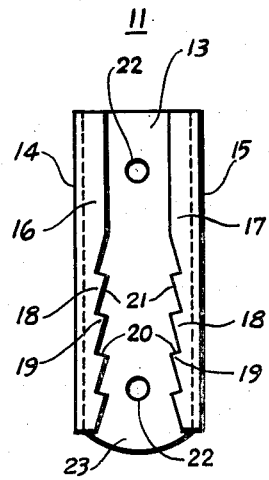
Jan. 10, 1961 — E. G. HENRY — 2,967,342
ADJUSTABLE STRAP FASTENER
Filed May 26, 1958
INVENTOR.
EARLE G. HENRY.
BY
ATTORNEY.

2,967,342

ADJUSTABLE STRAP FASTENER

Earle G. Henry, Solana Beach, Calif., assignor to General Dynamics Corporation, San Diego, Calif., a corporation of Delaware Filed May 26, 1958, Ser. No. 737,658

4 Claims. (Cl. 24—206)

The present invention generally relates to adjustable fasteners, and more particularly relates to a fastener which is composed of two separate major elements which can be adjustably locked together so that items attached to these two elements can be adjustably held relative to one another.

The fastener is made in such a manner that it requires only one hand to connect, disconnect, and adjust the two major elements. It is compact, lightweight, and relatively inexpensive to manufacture. The device can perform a variety of adjustable fastening functions in areas such as belts, harness, sports equipment, clothing, auto furnishings, boat furnishings, and other areas. One use for which the present invention is particularly adapted is the adjustable fastening of oxygen masks to pilot's helmets, requiring the use of only one hand and a minimum of time and effort.

An object of the present invention is to provide a novel fastener for quickly connecting two or more items together.

Another object is to provide a fastener composed of two major elements which can be connected, adjusted, and disconnected with the use of only one hand.

A further object is to provide an adjustable fastener which is simple to operate, compact and lightweight in construction, and inexpensive to manufacture.

Still other objects and features of the present invention will be readily apparent to those skilled in the art from the following specification and appended drawings wherein a preferred form of the invention is illustrated, and in which:

Figure 1 is an elevational view of a fastener embodying the present invention.

Figure 2 is a sectional view taken along line 2—2 of Figure 1.

Figure 3 is an elevational view of one of the two major components of the present fastener; and Figure 4 is an elevational view of the second major component.

Referring more particularly now to the drawings, the present fastener is designated therein in its entirety by the numeral 10 and is formed of two major components, a rack element 11 and a catch element 12.

Referring now to Figure 3, rack element 11 is shown to be elongated and generally rectangular in outline and to comprise a back or base portion 13 with a pair of longitudinally directed side walls 14 and 15 thereon defining a channel therebetween. Walls 14 and 15 have integrally formed thereon, respectively, guide flanges 16 and 17 which are directed inwardly toward one another. Each of the inner edges of the guide flanges 16 and 17 is notched or serrated over a portion of its length, as at 18, to provide a series of teeth 19. These serrated portions 18, as shown, do not in the present embodiment extend the entire length of the flanges 16 and 17, however, it is to be understood that, if desired, these flanges could be fully serrated. Each of the teeth 19 is formed with an abutment 20 and an inclined side edge 21.

Back portion 13 has formed therein longitudinally spaced holes 22 to accommodate rivets, screws or other suitable fasteners by which the rack element 11 may be conveniently attached to another item. Back portion 13 at its lower end includes a rounded entry lip 23 which facilitates insertion of another element into the channel defined by guide flanges 16 and 17.

Figure 4 illustrates the catch element 12 which is the second major component of the present invention. Catch element 12 includes a slide member 24, generally in the form of an inverted T, which is adapted for inserted in the lower end of element 11 and for longitudinal slidable movement in the channel between the guide flanges 16 and 17. Slide member 24 includes an elongated portion 25 and an integral, transverse attachment portion 26 having spaced slots 27 and 28 formed therein. Slots 27 and 28 are provided for the accommodation of straps or the like by which the slide element 24 may be connected to other items. The particular configuration of the attachment portion 26 lends itself, for instance, to being readily connected to the straps of a pilot's oxygen mask. It should be apparent, however that the configuration of the attachment portion is not limited to that shown in Figure 2, for there are many applications other than oxygen masks where the present invention has utility and where the attachment portion 26 assumes other shapes as dictated by the items to be connected.

Slide member 24 adjacent the upper end of its portion 25 carries a pin 31 which protrudes normally therefrom and is suitably rigidly secured thereto. Pivotally mounted on pin 31 is a pair of catches 32 and 33. The disposition of catches 32 and 33 on pin 31 is such that they lie in overlapping relationship, with catch 32 being above catch 33. Each of the catches includes a base portion 34, the base portion of upper catch 32 having a slot 35 therein which receives a pin 36 which is fixedly attached to base 34 of catch 33 and protrudes normally and upwardly therefrom into slot 35. The resultant pin and slot arrangement limits the amount of separation and closure of the catches relative to one another. It is apparent that, if desired, pin 36 could be located on upper catch 32 and slot 35 could be provided in lower catch 33; or a slot could be provided in each catch and the movement limiting pin could be attached to the slide member 24. In any event, the result is a means for restricting motion of the catches relative to one another.

In addition to these structural features, the catches 32 and 33 each has an outer downwardly depending flange 37. These outer flanges are adapted to be manually grasped to act as finger and thumb grips for pivotal rotation of the catches inwardly toward each other. Each catch also includes a downwardly depending flange 38 disposed oppositely to and spaced from flange 37 and serving as a stop for cooperation with teeth 19 of rack 11. When slide element 24 is inserted in the channel of rack element 11 stop 38 act upon teeth 19 to restrict movement of element 24 to one direction relative to element 11. This restrictive movement is brought about by a wire spring 42 positioned on pivot pin 31 and normally exerting its bias on catches 32 and 33 to hold them in a spread position as shown in Figure 1. Spring 42 is of substantially U shape with the legs thereof bearing against the inner walls of stops 38 to separate the two catches to the extent permitted by pin 36 and slot 35, or when element 24 is contained in element 11, to the extent permitted by the serrated portions 18. Spring 42 at its bight portion is coiled once completely around pivot pin 31 to insure its staying in place. It is understood, however, that spring 42 could assume other shapes or forms and still perform its function of spreading the catches 32 and 33.

Figure 1 illustrates slide element 24 positioned on rack element 11 and locked relative thereto by reason of the engagement of stops 38 with the abutments 20 of a pair of teeth 19. It is apparent that when stops 38 are in engaged position slide element 24 cannot be withdrawn from rack 11. By reason of the particular formation of teeth 19 slide element 24 can slide inwardly of the channel of rack 11, ratcheting over teeth 19, without any manual manipulation of catches 32 and 33. However, for withdrawal of slide member 24 it is necessary that catches 32 and 33 be manually pressed toward one another to free stops 38 from teeth 19. Of course, with catches 32 and 33 pressed together and stops 38 in freed position slide member 24 may be moved in either direction relative to rack 11.

As stated above, in the inward movement of slide element 24 stops 38 ratchet over teeth 19 and there is no necessity that manual pressure be applied to catches 32 and 33. Therefore, in assembling slide element 24 to rack 11 it may be held at any part thereof in order to push the upper end of slide element 24 into the mouth of channel of rack 11. Continued inward movement will cause stops 38 to ride on inclined edges 21 of the lowermost teeth 19 pivoting catches 32 and 33 inwardly against the bias of spring 42. As soon as stops 38 reach abutments 20 of these teeth, spring 42 reverses catches 32 and 33 to dispose the stops over these abutments. Now slide element 24 cannot be separated from rack 11 without manual manipulation of catches 32 and 33 and accidental dislodgement of slide element 24 from rack 11 is avoided.

It is understood, of course, that the spacing of thumb and finger grip flanges 37 and the stop flanges 38 is such that the serrated flanges 16 and 17 of rack 11 will be readily accommodated therebetween and catches 32 and 33 will be free to move to carry stop flanges 38 toward and away from engagement with teeth 19.

There has thus been described a fastener device whose coupling components are readily and effectively connected, are readily adjustable relative to each other, and are quickly detached as desired and with the use of but one hand.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. An adjustable fastener comprising a first coupling element having a longitudinally directed channel and a pair of opposed longitudinal guide flanges adjacent said channel, at least one of said guide flanges including a plurality of serially arranged serrations, a second coupling element including a slide member adapted for insertion into the end of said channel of said first coupling element for longitudinal sliding movement relative to said guide flanges, said guide flanges being arranged to overlap the lateral edges of said slide member, a pair of manually operable catches pivotally mounted on said slide member and in overlapping relationship to one another, spring means normally biasing said catches for separation, at least one of said catches having stop means cooperating with said serrations when said catches are separated to permit longitudinal sliding of said slide member in only one direction while said catches are under spring bias, and a pin and slot connection for said catches for limiting the amount of separation of said catches by said spring means when said second coupling element is free of first coupling element.

2. An adjustable fastener comprising a first coupling element having a base, opposed side walls defining a longitudinal channel and a pair of opposed longitudinal guide flanges each including a plurality of serially arranged teeth, a second coupling element including a slide member adapted for insertion in the end of said channel of said first coupling element and for longitudinal sliding movement therein relative to said guide flanges, said guide flanges being arranged to overlap the lateral edges of said slide member, a pair of catches pivotally mounted on said slide member and in overlapping relationship to one another, spring means biasing said catches for separation, stop means on each of said catches engageable with said teeth to permit longitudinal sliding in only one direction while said catches are under spring bias, said catch means being manually actuable against the bias of said spring for disengagement of said stop means from said teeth to permit withdrawal of said second coupling element from said first coupling element, and a pin and slot connection between said catches for limiting the amount of separation of said catches by said spring means when said second coupling element is withdrawn from said first coupling element.

3. An adjustable fastener for adjustably connecting one item to another, said fastener comprising a first coupling element having a base, a pair of opposed side walls defining a longitudinal channel and a pair of longitudinal guide flanges integral respectively with said pair of side walls, each of said guide flanges having a plurality of longitudinally arranged teeth, a second coupling element including a slide member having an attachment portion, said attachment portion having attaching slots therein, said slide member having a body portion adapted for insertion in the end of said channel of said first coupling element and for longitudinal sliding movement therein relative to said guide flanges, said guide flanges extending toward one another to overlap the lateral edges of said slide member, a pin carried by said slide member and protruding normally therefrom between said guide flanges, a pair of manually operable catches pivotally supported on said pin over said guide flanges and in overlapping relationship to one another, spring means on said pin for biasing said catches in opposite directions for separation thereof, stop means on each of said catches engageable with said teeth to permit longitudinal movement of said slide member in only one direction while said catches are under spring bias, each catch having a portion thereof extending over and laterally beyond a guide flange, said portions including outer flanges which enclose said guide flanges and are manually engageable for moving said catches toward one another against the bias of said spring to disengage said stop means from said teeth whereby said second coupling member can slidably move in opposite directions within, and be removed from, said first coupling member, and a pin and slot connection between said catches for limiting the amount of separation of said catches by said spring means when said second coupling element is withdrawn from said first coupling element.

4. An adjustable fastener for adjustably connecting one item to another, said fastener comprising a first coupling element having a substantially flat and rectangular base portion, a pair of opposed longitudinal side walls integral with and extending normally from said base portion, said side walls and base portion defining a longitudinal channel, each side wall having a guide flange extending normally therefrom towards said opposite side wall, each of said guide flanges having a plurality of teeth arranged longitudinally along a portion thereof; a second coupling element including a slide member having an attachment portion, said attachment portion having slots therein, said slide member having a flat, long, and substantially rectangular plate portion adapted for insertion in the end of said channel of said first coupling member and for longitudinal sliding movement therein, said guide flanges of said first coupling member overlapping the lateral edges of said plate portion, a pin fixed to said plate portion and protruding normally therefrom between said guide flanges, a pair of manually operable catches pivotally supported on said pin over said guide flanges and in overlapping relationship to one another, a wire spring bent around said pin with the ends thereof contacting said catches and biasing them in opposite directions for separation thereof, stop means on each of said catches engageable with said teeth to restrict longitudinal movement of said slide member to one direction only while said catches are biased against said teeth, each catch having a portion thereof extending over and laterally beyond a guide flange, said portions including outer flanges which enclose said guide flanges and which are manually operable for moving said catches toward one another against the bias of said spring to disengage said stop means from said teeth whereby said second coupling member can slidably move in opposite directions within, and be removed from, said first coupling member, and a pin and slot connection between said catches for limiting the amount of separation of said catches by said spring when said second coupling element is withdrawn from said first coupling element.

References Cited in the file of this patent

UNITED STATES PATENTS

| | | |
|---|---|---|
| 423,509 | Asmus | Mar. 18, 1890 |
| 1,907,778 | Freysinger | May 9, 1933 |
| 1,910,891 | Freysinger | May 23, 1933 |